Patented Nov. 12, 1940

2,221,677

UNITED STATES PATENT OFFICE 2,221,677

STORAGE BATTERY

William H. Grimditch, Rydal, Pa., assignor to Philco Corporation

No Drawing. Application November 29, 1937, Serial No. 177,165

4 Claims. (Cl. 136—65)

This invention relates to storage batteries, and more particularly to a grid for use in the positive plate of Faure type storage batteries utilized in floating charge service.

In such service the storage battery is continuously charged, and while, in some instances, it may be discharging at the same time, in the majority of instances it is held in reserve for supplying emergency power in event of failure of the electrical supply from which it is charged as, for example, in emergency lighting systems for theatres, in emergency power reserve systems for telephone exchanges and the like.

Obviously, such batteries are subjected to very severe treatment, and in batteries of the ordinary construction it has been found that destruction of the negative plate may be sufficiently rapid to render constant inspection and frequent replacement necessary.

The grids of such batteries are usually constructed of an alloy of lead and antimony, in which the antimony content in the grids of both plates is at least 7 per cent by weight. It may be readily noted that in such batteries the deterioration is mainly at the negative plate, which is often the point of failure in the battery. This destruction is, apparently, due to an electrochemical action, and I have discovered that this action may be greatly minimized, if not completely eliminated, from a practical standpoint insofar as its destructive tendencies are concerned, by using different amounts of antimony in the positive and negative grids while maintaining the amount of antimony in the positive grid considerably less than that employed in the negative grid. Specifically, I have found that a decrease in antimony content in the positive grid as compared to that in the negative of approximately 40 per cent is very effective, batteries in which the antimony content was 4 per cent by weight in the positive grid and 10 per cent by weight in the negative showing a vastly increased life and maintained capacity and higher terminal voltage as compared with batteries tested under the same conditions and through the same periods in which the antimony content of the grids was 7 per cent in the positive and 10 per cent in the negative. The improved operation of the battery is disclosed both by reduction and substantial elimination of shedding of the active material carried by the grid and the warping and breakage of the grids themselves, in longer life and better maintenance of the charge while standing.

While the alloy percentages given above are preferred, the relative percentages of antimony in the two plates may be varied considerably provided a differential is maintained sufficient to obviate the deterioration encountered due to the electrochemical action. Generally speaking, where the antimony content of the negative grid is 10 per cent, the percentage in the positive may be varied between 2 and 5½ per cent, although at the lower figure it will be found that the grid offers greater manufacturing difficulties and the operation of the battery as a whole is less certain and more variable than when the preferred ratio is employed.

I claim:

1. A storage battery for use in continually charged service comprising pasted-plate positive and negative plates, the grids of said plates comprising an alloy containing led and antimony, the antimony content of the positive grid being in the neighborhood of 4 per cent by weight and that of the negative grid being in the neighborhood of 10 per cent by weight whereby to minimize electro-chemical destruction of the negative plate.

2. A storage battery for use in continually charged service comprising pasted-plate positive and negative plates, the grids of said plates comprising an alloy containing lead and antimony, the antimony content in the negative grid being in the neighborhood of 10 per cent by weight and that of the positive grid being 2 to 5½ per cent by weight whereby to minimize electro-chemical destruction of the negative plate.

3. A storage battery for use in continually charged service comprising pasted-plate positive and negative plates, the grids of said plates comprising an alloy of lead and antimony in a ratio of not substantially less than 10 to 1, the antimony content of the positive grid being less than that of the negative grid by approximately 40 per cent whereby to minimize electro-chemical destruction of the negative plate.

4. A storage battery for use in continually charged service comprising pasted-plate positive and negative plates, the grids of said plates comprising an alloy of lead and antimony in a ratio of not substantially less than 10 to 1, the antimony content of the positive grid being less than 55 per cent of that of the negative grid but more than 20 per cent thereof whereby to minimize electro-chemical destruction of the negative plate.

WILLIAM H. GRIMDITCH.